Jan. 4, 1966    F. W. RENWICK, SR    3,227,836
HEARING AID SWITCH
Filed Nov. 8, 1963

INVENTOR.
FREDERICK W. RENWICK

BY William E. Cleaver

ATTORNEY

United States Patent Office 3,227,836
Patented Jan. 4, 1966

3,227,836
HEARING AID SWITCH
Frederick W. Renwick, Sr., 111 E. Park Ave.,
Maple Shade, N.J.
Filed Nov. 8, 1963, Ser. No. 322,363
3 Claims. (Cl. 200—61.58)

This invention relates to a hearing aid device as found in spectacles or eyeglasses wherein the frame is used to house the circuit and equipment necessary for the amplification of the sound.

The use of hearing aids in eyeglasses is well known and all of the various innovations thereof have at least four elements in common. Each such hearing aid has a receiver, volume control means, microphone and battery. This invention is mainly concerned with preserving the life of the battery.

Heretofore hearing aids have been turned on by means of a switch mounted on the frame. The switch has had to be manually turned on and turned off. Many of these switches are difficult and/or awkward to turn on, once the glasses have been mounted on the user's head. Each of these switches has the same undesirable characteristic in that if they are not manually turned off, the amplification circuit remains energized and drains the energy of the battery. Since it is human nature to forget to turn the switch off when the eyeglasses are removed, the circuit very oft stays energized when the eyeglasses are not in use. As a result the batteries in such eyeglass-hearing-aid arrangements are replaced far more often than they need be and the frustrations of not being able to hear a conversation because of a weak battery occurs far more often that it should.

Accordingly, it is an object of my invention to provide an improved on-and-off switch for an eyeglass-hearing-aid device.

It is a further object of my invention to provide an on-and-off hearing aid switch which will automatically turn off the amplification circuit and hence the battery drain when the glasses are not being worn.

In accordance with a feature of the present invention there is provided a spring loaded switch on the frame of the eyeglasses which will return to an open circuit position when not subjected to the forces which result from a person's wearing the eyeglass frame.

The foregoing and other objects and features of this invention will be best understood by reference to the following description of preferred embodiments of the invention taken in conjunction with the accompanying drawing, wherein.

Figure 1:
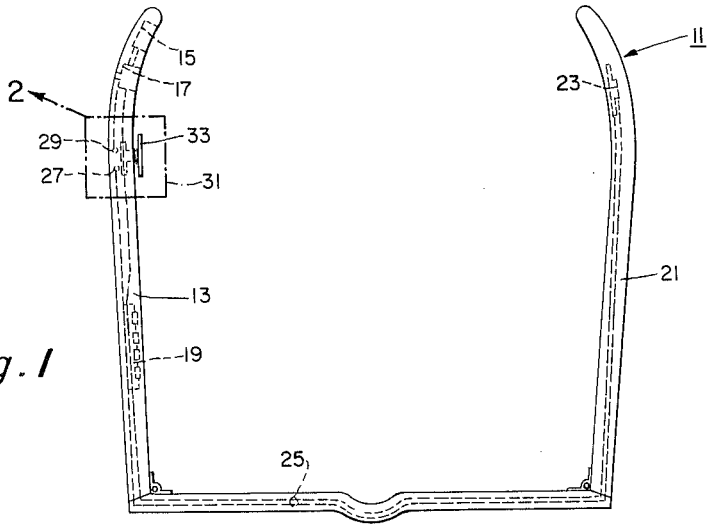
FIGURE 1 is a pictorial schematic of an eyeglass frame showing one embodiment of the switch.

Consider now FIGURE 1 which shows an eyeglass frame 11 with an amplification circuit and amplification equipment housed therein. In the right hand sidepiece 13 there is located a battery 15 and a microphone 17 as well as an amplification circuit 19. In the left hand side piece 21 there is found a reproducer device 23 which includes a volume control means. The earpiece for the user is connected to the reproducer 23 but is not shown. It should be clearly understood that the battery 15, microphone 17, amplification circuit 19 and reproducer 23 could be located in other places around the frame without detracting from the present invention.

Figure 2:
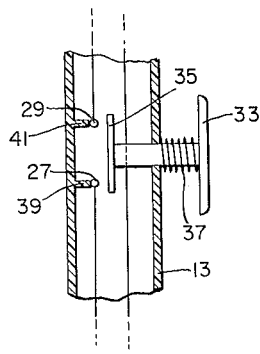
FIGURE 2 is one embodiment of the switch as found along the side piece of the eyeglass.

Each of the components of the hearing aid circuit is connected to a common pair of wires 25 which are placed around the cavity of frame 11. One of the leads of the common pair is broken to provide two contacts disposed in close proximity to each other. In FIGURES 1 and 2 the contacts 27 and 29 are shown. If a circuit is completed across contacts 27 and 29 current will flow from the battery 15 to the remainder of the circuit to cause the hearing aid to be operative.

Consider now FIGURE 2 which is an enlarged view of FIGURE 1 at the location 31. When the side piece 13 is placed on the head of the user the plunger 33 is forced toward the outside of the frame thereby causing the metal strip 35 to create an electrical circuit path between the contacts 27 and 29. Hence, when the eyeglass frame 11 is worn the switch (made up of plunger 33, metal strip 35 and spring 37) is closed and the hearing aid is in operation to enable the user to hear.

When the metal strip 35 presses against the contacts 27 and 29, the resilient mountings 39 and 41 give way enough and push back enough so that the contacts 27 and 29 are permanently moved out to a position to make contact and in addition so that if the plunger 33 moves the strip 35 slightly away from the contacts position the contacts 27 and 29 will follow, thereby insuring a good contact at all times. The mountings or supports 39 and 41 can be made of a substantially hard rubber, or any one of many well known plastics which provide a degree of resiliency.

As can be seen in FIGURE 2, the plunger 33 is spring loaded with the spring 37. The spring 37 can be a tension spring and mounted inside or as a compression is connected to the upper end of the plunger 33 and to the frame piece 13 on the outside. Because the plunger is spring loaded, when the eyeglass frame is removed the plunger is returned to its normal position (as shown in FIGURE 2) which opens the circuit to the battery and prevents the useless current drain thereof.

Figure 3:
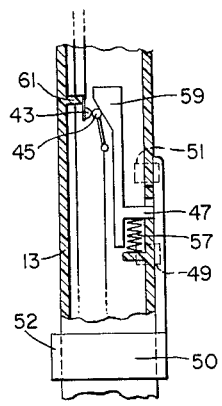
FIGURE 3 is a second embodiment of the switch as found along the side piece of the eyeglass.

FIGURE 3 shows a second embodiment of the switch and it should be understood that the switch of FIGURE 3 can also be located at position 31 in FIGURE 1 or some other suitable location where the wearer's head comes in relatively firm contact with the eyeglass frame. In FIGURE 3, a pair of contacts 43 and 45 are shown in closed contact position. A plunger 47 is shown mounted on two clips or grippers 49 and 51. The grippers 49 and 51 fit into two grooves so that the plunger 47 can slide along the side piece. Further in FIGURE 3 there is shown a finger grip 50 which fits over the sidepiece 13. The wearer can simply push the finger grip 50 at the outside position 52 to slide the plunger 47 to the front of the sidepiece and make the contact between 43 and 45.

The plunger 47 is spring loaded by spring 57 to drive the plunger toward the rear of the glass frame when the eyeglass are not being worn. When the plunger 47 is in its most rearward position, the wedge 59 of the plunger is moved out of position to allow the contacts 43 and 45 to separate. The contact 43 is secured by the support 61, which keeps the contact 43 from following the contact 45 when a contact break is intended, but which is sufficiently resilient to follow contact 45 to insure a good contact.

When the eyeglasses are worn the movement of the side piece toward the back of the head causes the plunger 47 to slide forward thereby closing contacts 43 and 45. The friction force of the plunger against the user's head will keep the plunger from returning to its open position (the force of the spring being determined to accommodate such an arrangement). When the eyeglass frame is removed the plunger returns, thereby opening the contacts 43 and 45 and preventing the useless current drain on the battery 15.

Figure 4:
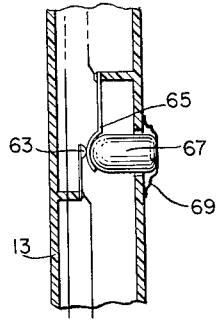
FIGURE 4 is a third embodiment of the switch as found along the side piece of the eyeglass.

In FIGURE 4, the switch operates quite similar to the switch of FIGURE 2. The contacts 63 and 65 are closed by the plunger 67. The plunger 67 is mounted on web material 69 which is flexible and which is forced toward the outside when the eyeglass frame is worn. The plunger 67 is returned to its open position by the contact strap 65 which acts both as a contact and a spring for spring loading the plunger.

When the eyeglass piece is not being worn the plunger returns to its open position, thereby opening the contacts and preventing the useless drain of current from battery 15.

Figure 5:
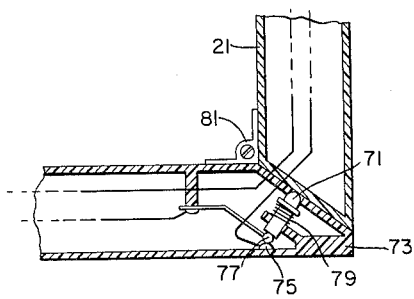
FIGURE 5 is a fourth embodiment of the switch as found at the corners of the eyeglass frame and the side piece.

In FIGURE 5, the plunger 71 is spring mounted in the glass piece 73. When the eyeglasses are being worn the side piece 21 pushes the plunger 71 to close the contacts 75 and 77 to complete the circuit from the battery 15. When the eyeglasses are removed the plunger 71 being spring loaded by spring 79 forces the side piece 21 to rotate on hinge 81 thereby opening contacts 75 and 77 to prevent wasteful current flow.

The embodiment in FIGURE 5 has the advantage that it is not dependent on a relatively close fit of the frame to the head of the user and that normally a user will close the sidepiece when the eyeglasses are not in use.

Figure 6:
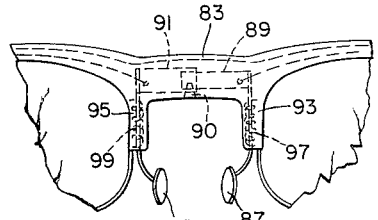
FIGURE 6 is a fifth embodiment of the switch as found at the nose piece of the frame.

In FIGURE 6, the switch is shown in the bridge or nose piece 83. The nose rests 85 and 87 act through their rods as the plungers. The nose rests 85 and 87 are formed in an offset so that when they are spread apart upon fitting on the nose they drive the two contacts 89 and 91 toward each other to make contact when stopped by rest 90.

The nose rests 85 and 87 are mounted in housings 93 and 95. In each of the housings 93 and 95 there is included a spring (spring 97 and 99) which twists around the nose rest rod and is secured at one end thereto. When the eyeglass frame is removed from the user's head the nose rests are returned by spring action to their open position which in turn opens the contacts 89 and 91. With the contacts 89 and 91 open, the battery circuit is broken.

The switch of FIGURE 6 has the advantage that in all probability there is a firmer fit at the nose piece, i.e., a firmer fit between the head and the eyeglass frame, than any other location, thus insuring a good contact for the switch when worn, and permissible relatively heavy spring loading to insure opening the circuit.

It should be understood that the circuit could be equipped with a manual switch in addition to enable the user to turn off his hearing aid while wearing the eyeglasses for whatever reason he might want to, but such an additional switch would not add or detract from the purpose of this inventive switch which is to automatically save the battery when the glasses are not being worn.

While I have described the above principles of my invention in connection with specific apparatus, it is to be fully understood that this description is made only by way of example and not as a limitation to the scope of my invention as set forth in the objects thereof and in the accompanying claims.

I claim:
1. A hearing aid switch means for a hearing aid circuit which is located in an eyeglass frame, wherein said eyeglass frame has at least one side piece, one eyeglass piece, one nose piece and a cavity to hold circuit continuity contacts of said hearing aid circuit, comprising:
   (a) a pair of circuit continuity contacts located in said cavity and adapted to be connected to one another in order to close said hearing aid circuit;
   (b) means mounting said circuit continuity contacts within said cavity so as to hold said contacts apart;
   (c) actuating means disposed partially within said cavity and partially out of said cavity and adapted to move substantially parallel to said side piece within said cavity to close said circuit continuity contacts, said actuating means further adapted to hold said circuit continuity contacts closed in response to the pressure of the head of the wearer of said eyeglass, thereby activating said hearing aid circuit; and
   (d) spring means coupled to said actuating means to spring load said actuating means and automatically return it to a position wherein it does not act to close said circuit continuity contacts in response to the removal of said eyeglass frame from a wearer's head, thereby automatically disconnecting said hearing aid circuit.

2. A hearing aid switch means according to claim 1 wherein said actuating means is disposed to move along the side of said side piece and wherein said circuit continuity contacts are disposed along a line substantially perpendicular to said side piece and further wherein said actuating means has a portion within said cavity formed to cause one contact to close on the other in response to said substantially parallel movement.

3. A hearing aid switch means according to claim 1 wherein said cavity is located in said nose piece and wherein said actuating means includes a pair of nose rest rods each connected to a difference nose rest, said nose rest rods disposed and formed such that when they are moved substantially parallel to said side piece, in response to the nose rests being separated, they act to close said circuit continuity contacts.

References Cited by the Examiner

UNITED STATES PATENTS

| | | | |
|---|---|---|---|
| 864,858 | 9/1907 | Pape | 200—52 |
| 2,830,132 | 4/1958 | Borg | 200—61.58 X |
| 2,930,857 | 3/1960 | Hollingsworth | 200—61.58 XR |
| 2,951,916 | 9/1960 | Scheffer | 200—159 XR |
| 3,047,699 | 7/1962 | Patti | 200—159 |
| 3,104,290 | 9/1963 | Rosemond et al. | 179—107 |

BERNARD A. GILHEANY, *Primary Examiner.*

J. J. BAKER, *Assistant Examiner.*